US006797181B2

United States Patent
Morse et al.

(10) Patent No.: US 6,797,181 B2
(45) Date of Patent: Sep. 28, 2004

(54) PROCESS FOR MIXING TREATMENT ADDITIVES TO CONTAMINATED LIQUIDS

(76) Inventors: Dwain E. Morse, 2655 Montrose Pl., Santa Barbara, CA (US) 93105; Wade O. Morse, 1536 W. Valerio St., Santa Barbara, CA (US) 93101; Thomas G. Matherly, 300 Huntington Pl., Lompoc, CA (US) 93436

( * ) Notice: Subject to any disclaimer, the term of this patent is extended or adjusted under 35 U.S.C. 154(b) by 173 days.

(21) Appl. No.: 10/270,995

(22) Filed: Oct. 14, 2002

(65) Prior Publication Data

US 2004/0069724 A1 Apr. 15, 2004

Related U.S. Application Data

(63) Continuation-in-part of application No. 10/180,216, filed on Jun. 25, 2002.
(60) Provisional application No. 60/300,768, filed on Jun. 25, 2001.

(51) Int. Cl.[7] .................. B01D 17/038; B01F 15/00; C02F 1/00
(52) U.S. Cl. .................. 210/745; 210/702; 210/739; 210/788; 210/806; 210/205; 210/209; 210/257.1; 210/512.1; 210/512.2; 366/165.1; 366/338
(58) Field of Search ................. 210/702, 739, 210/745, 788, 806, 205, 209, 257.1, 512.1, 512.2; 366/165.1, 338

(56) References Cited

U.S. PATENT DOCUMENTS

| 4,237,006 A | * | 12/1980 | Colman et al. ............. 210/788 |
| 4,933,094 A | * | 6/1990 | Kalnins ...................... 210/788 |
| 6,562,240 B1 | * | 5/2003 | Clark ....................... 366/165.1 |

FOREIGN PATENT DOCUMENTS

WO    WO 00/07687 A1  *  2/2000   .......... B01D/17/04

* cited by examiner

Primary Examiner—David A. Reifnsyder
(74) Attorney, Agent, or Firm—Kelly Lowry & Kelley, LLP

(57) ABSTRACT

To optimally mix treatment additives to a contaminated liquid, treatment additives are selected. A mixing energy requirement of the contaminated liquid and treatment additives is then determined by mixing the treatment additives over a range of time and mixing speeds, and measuring turbidity to determine the mixing time and speed which results in the lowest turbidity. A low mixing energy requirement requires a lower mixing time and mixing speed than a higher mixing energy requirement. The contaminated liquid and selected treatment additives are then directed into a mixing system including at least one hydrocyclone. Each hydrocyclone has an inlet aspect ratio, a barrel length and diameter selected based upon the mixing energy requirement determination. Altering the aspect ratio, diameter, and length of the hydrocyclone results in different mixing speeds and mixing time, which can be optimized for the given contaminated liquid and treatment additives.

21 Claims, 6 Drawing Sheets

| Mixing Time | Speed 1 | Speed 2 | Speed 3 | Speed 4 |
|---|---|---|---|---|
| 20 Sec. | 381 | 199 | 166 | 86 |
|  | 331 | 160 | 173 | 89 |
|  | 382 | 166 | 144 | 82 |
|  | 351 | 167 | 165 | 81 |
| Average | 361.25 | 173 | 162 | 84.5 |

| Mixing Time | Speed 1 | Speed 2 | Speed 3 | Speed 4 |
|---|---|---|---|---|
| 30 Sec. | 266 | 138 | 144 | 56 |
|  | 282 | 148 | 120 | 75 |
|  | 293 | 126 | 128 | 73 |
|  | 309 | 132 | 117 | 71 |
| Average | 287.5 | 136 | 127.25 | 68.75 |

| Mixing Time | Speed 1 | Speed 2 | Speed 3 | Speed 4 |
|---|---|---|---|---|
| 40 Sec. | 227 | 85 | 94 | 85 |
|  | 222 | 102 | 113 | 64 |
|  | 197 | 94 | 84 | 64 |
|  | 246 | 108 | 82 | 64 |
| Average | 223 | 97.25 | 93.25 | 69.25 |

| Mixing Time | Speed 1 | Speed 2 | Speed 3 | Speed 4 |
|---|---|---|---|---|
| 50 Sec. | 215 | 90 | 82 | 50 |
|  | 220 | 85 | 73 | 58 |
|  | 199 | 105 | 75 | 54 |
|  | 201 | 73 | 67 | 76 |
| Average | 208.75 | 88.25 | 74.25 | 59.5 |

| Mixing Time | Speed 1 | Speed 2 | Speed 3 | Speed 4 |
|---|---|---|---|---|
| 60 Sec. | 183 | 73 | 70 | 72 |
|  | 181 | 74 | 49 | 76 |
|  | 184 | 60 | 58 | 65 |
|  | 175 | 96 | 59 | 87 |
| Average | 180.75 | 75.75 | 59 | 75 |

FIG. 3

PROCESS FOR MIXING TREATMENT ADDITIVES TO CONTAMINATED LIQUIDS

RELATED APPLICATION

This application is a continuation-in-part of U.S. application Ser. No. 10/180,216 filed Jun. 25, 2002, now published as U.S. patent application Publication No. 2004/0069724 A1, still pending and which claims the benefit of priority to U.S. Provisional Application Serial No. 60/300,768, filed Jun. 25, 2001.

BACKGROUND OF THE INVENTION

In treating contaminated water, such as waste water or the like resulting from agricultural or industrial processes, it is necessary to mix treatment additives with the contaminated water in order to effectively remove the contaminants. For example, in flotation systems wherein the contaminants are removed through the process of coalescing bubbles which float to the surface and form flocs which can be skimmed or otherwise removed from the liquid, additives such as cationic substances, anionic substances, acids, bases, clay, diatomaceous, earth, coagulants and polymers are used to selectively alter the contaminated liquid chemistry and remove the contaminants.

It is preferred that the contaminated liquid and treatment additives form a homogenous mixture such that when the dissolved gas is added and subsequently allowed to coalesce into bubbles, a good majority of the contaminants will be taken to the surface with the bubbles. If the mixture is not homogenous, an unacceptable amount of contaminants may remain in the liquid even after treatment.

In the past, treatment additives have been added to the contaminated liquid in several manners. For example, treatment additives are often mixed into a tank of contaminated liquid and then mechanically stirred with a mixer or the like. However, it has been found that the treatment additives tend to "glob" to each other prematurely.

As shown in FIG. 1, treatment additives having a monomer backbone and a positive charge site can cluster or "glob", preventing all of the negatively charged waste particles from being attached thereto, resulting in incomplete mixing and excessive use of treatment chemistry. After adding coagulant 16, polymers and anionic or cationic polymers 10 and 12 are often added to the contaminated liquid in order to cluster the strands of polymers to one another to create clusters of sufficient size so as to be removed in the flotation and flocculation process. However, due to the fact that the polymer strands are wound or "globbed" together, the polymer 16 can only attach a minimal amount of waste particles 14 to the polymers 10 and 12. Thus, free-floating waste particles 14 and coagulants 16 may not be removed due to their size, or the treatment process of removing such contaminants which relies upon the attachment of the waste particle 14 to the polymers 10 and 12. Additionally, an excess amount of coagulant 16 will probably be introduced into the contaminated liquid in an attempt to coagulate to the greatest extent possible, thus wasting valuable coagulant and polymer.

Thus, such mixing is imprecise and optimal mixing is not achieved. This can result in wasting valuable chemical treatment additives, and also result in the failure of removing as many contaminants as possible.

Others have added chemicals and other treatment additives into a flowing contaminated stream. This stream has been introduced into a mixing device, typically a hydrocyclone. However, the inventors have found that certain treatment additives are very sensitive to the speed of the flowing liquid. Thus, over mixing, as well as under mixing, can have deleterious effects on the additives and may alter their behavior or efficiency. The inventors of the present invention have also found that the mixing time for various treatment additives vary according to the speed of the fluid. However, over mixing, once again, can have deleterious effects on certain treatment additives. In the past, it was believed that vigorous mixing over a prolonged period of time provided optimal mixing. However, the inventors have found that this is not the case.

Accordingly, there is a need for a method of mixing treatment additives to contaminated liquid which optimizes the time and speed of mixing to homogeneously mix and efficiently utilizes the treatment additives, thus requiring less additives and facilitating optimum removal of the contaminants from the liquid. The present invention fulfills these needs and provides other related advantages.

SUMMARY OF THE INVENTION

The present invention resides in a process for mixing treatment additives to contaminated liquid, such as waste water, so as to optimize the mixing between the contaminated liquid and the treatment additives, and in order to utilize the lowest amount possible of the treatment additive. First, one or more treatment additives are selected. This includes the step of determining the identity of the additives and the amount of each additive needed to treat the contaminated liquid. This entails mixing various treatment additives to a sample of the contaminated liquid over time and determining the effective additives, and the amount of each additive necessary to treat a given volume of contaminated liquid.

Next, a mixing energy requirement of the contaminated liquid and the selected treatment additives is determined. The mixing energy requirement is determined by mixing the treatment additives over a range of mixing time and mixing speeds, and measuring turbidity to determine the mixing time and speed which results in the lowest turbidity. For example, a low mixing energy requirement requires a lower mixing time and mixing speed than a higher mixing energy requirement. Typically, for convenience, the mixing energy requirement is classified into either a low mixing energy requirement corresponding to lower mixing speeds and time, a medium mixing energy requirement based on higher mixing speeds and time, and a high mixing energy requirement based upon yet higher mixing speeds and time.

The contaminated liquid and the selected treatment additives are then directed into a mixing system. The mixing system includes at least one hydrocyclone having an inlet aspect ratio selected based upon the mixing energy requirement determination. The barrel length and diameter of the hydrocyclone are also selected based upon the mixing energy requirement determination. The aspect ratio of the hydrocyclone comprises the cross-sectional area of the inlet. Thus, the inlet is enlarged to correspond with a lower mixing energy requirement, and reduced in cross-sectional area to correspond to a higher mixing energy requirement. This is due to the fact that a smaller inlet will result in a higher velocity or speed of the liquid, whereas a larger cross-sectional area inlet results in a slower stream speed through the hydrocyclone. By increasing the diameter or the length of the hydrocyclone barrel, the overall mixing time is increased. Similarly, decreasing the length of the hydrocyclone barrel decreases the mixing time. Altering the diameter of the barrel can also effect the speed of the mixing.

In a particularly preferred embodiment, a plurality of hydrocyclones are fluidly coupled with one another. This can enable an appropriate mixing time throughout the length of the coupled hydrocyclones. Also, this enables the adding of treatment additives in stages throughout the mixing system. The aspect ratio and barrel length/diameter of each hydrocyclone can be selected based upon the mixing energy requirement determination of each treatment additive or group of treatment additives added to the contaminated liquid immediately upstream from that hydrocyclone.

The result of the mixing method of the present invention is a homogenous mixture which has been completely mixed and which has optimized the amount of treatment additives.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is a table depicting results of mixing tests at various times and speeds to determine a mixing energy requirement for a given treatment additive and contaminated liquid;

DETAILED DESCRIPTION OF THE PREFERRED EMBODIMENTS

Figure 1:
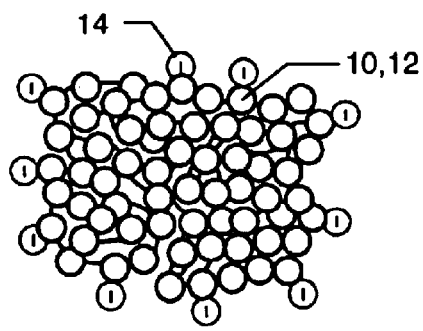
FIG. 1 is a diagrammatic view representing incomplete mixing of treatment additives and contaminants in a contaminated fluid using prior art mixing devices and methods.

As shown in the accompanying drawings for purposes of illustration, the present invention resides in a method for efficiently mixing liquids and/or solids comprising treatment additives into a liquid stream to provide a homogenous distribution of liquid, contaminants, chemistry and dissolved gas which is controllable. As will be more fully described herein, although the invention is embodied in a mixing system, including hydrocyclone mixing devices, of particular importance to the invention is not so much its components, but the fine tuning of those components so as to efficiently deliver specific quantities of mixing energy into a body of liquid to attain a homogenous distribution of treatment additive liquids and solids and contaminant liquid.

The effective use of the present invention results in the ability to use less treatment chemistry and generate cleaner liquid than other devices are capable of producing with far less mechanical failure.

The first step in the present invention is to select and determine the identity of one or more treatment additives, and the amount of each additive that is needed to treat the contaminated liquid. This is typically done in traditional fashion using the standard "jar test". That is, various treatment additives are added to samples of the contaminated liquid to determine the effective additives, and the amount of each additive necessary to treat a given volume of contaminated liquid. For example, liquids contaminated with different substances may require different treatment additives. Such treatment additives can comprise powdered clay, diatomaceous earth, cationic or anionic or non-ionic polymers, acids, bases, coagulants, etc. These treatment additives serve to bring the contaminated liquid to the desired pH, and properly charge the contaminants so that they can be linked to coagulants, polymers, etc. and removed from the liquid during the separation process, such as a flocculation and flotation removal process.

With reference now to FIG. 3, a mixing energy requirement of the contaminated liquid and the selected treatment additives is next determined. This is accomplished by mixing the treatment additives into the liquid over a range of mixing time and mixing speeds. The turbidity is measured to determine the mixing time and mixing speed which results in the lowest final turbidity. FIG. 3 shows the results of numerous tests taken over various mixing time ranges and at various speeds. The table of FIG. 3 is typically generated utilizing a magnetic stirrer to stir the liquid at a given speed, while the treatment additives are added in stages over time to a sample of the contaminated liquid.

The particular solution comprised a laundry waste water solution. The turbidity before chemistry or treatment additive and mixing was 2,528. Diatomaceous earth was added first at 900 ppm (parts per million). Three doses of cationic solution at 20 ppm each was then subsequently added. The inventors have found that adding the treatment additives in stages over time results in optimal mixing and the need for less treatment additives.

Surprisingly, as shown in FIG. 3, for each given contaminated liquid and treatment additive there is one or more optimal mixing speeds and times. Upon reviewing FIG. 3, it will become apparent that Speed 1, the lowest speed, regardless of the mixing time produces the highest turbidity. Turbidity is the clarity of the liquid after the given mixing time and speed after adding all of the treatment additives once the treatment additives and contaminants have either floated to the surface or sunk to the bottom of the liquid. A higher turbidity means that a great deal of contaminants are still in the liquid, whereas a lower turbidity measurement reveals fewer contaminants.

Generally, given these treatment additives and this particular contaminated liquid, the greater the mixing time and higher the speed results in less turbidity. However, using the highest speed, Speed 4 and the highest mixing time, 60 seconds between the addition of each treatment additive actually resulted in a turbidity reading of 75. This result is greater than the use of a slower speed, Speed 3, at the same time period which resulted in a reading of 59. Also, the use of Speed 3 over a period of 50 second intervals resulted in a slightly lower turbidity reading of 74.25. The use of the highest speed, Speed 4, for 50 second intervals, 40 second intervals, and 30 second intervals all resulted in a lower turbidity than the same speed at 60 second intervals. This result was unanticipated and it is believed that the treatment additives can actually be over-vigorously mixed such that certain treatment additives will lose their efficacy if mixed for too long or at too great of a speed. However, under-mixing these treatment additives results in removing fewer contaminants than is possible. Given the contaminated liquid and treatment additives of FIG. 3, it would be most desirable to mix the aforementioned treatment additives in 60 second intervals, for a total time of approximately 4 minutes, at Speed 3. Alternatively, the treatment additives would be sequentially added at 50 second intervals for a total time of approximately 3 minutes and 20 seconds at the highest speed, Speed 4. Such would result in the lowest turbidity, and the optimal removal of the contaminants. This indicates that at these mixing times and speeds optimal mixing has occurred.

Figure 2:
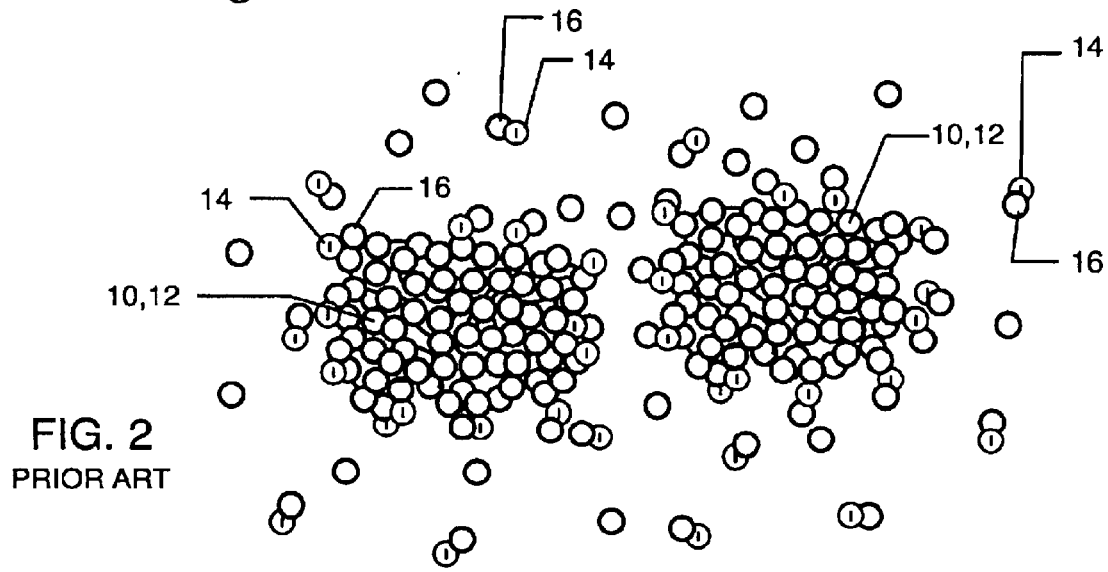
FIG. 2 is a diagrammatic representation of coagulants to the treatment additives in prior art mixing methods and apparatuses.
Figure 4:
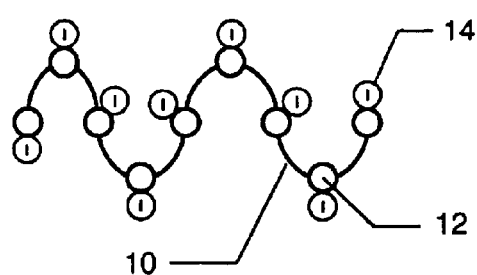
FIG. 4 is a diagram representing a treatment additive mixed with contaminants of a contaminated liquid in accordance with the mixing method of the present invention.
Figure 5:
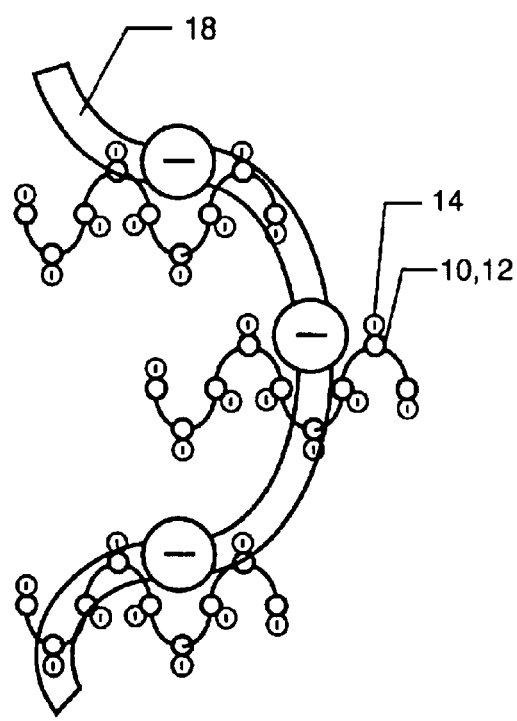
FIG. 5 is a diagram representing the addition of another polymer to create floc bridging in accordance with the mixing method of the present invention.

It has been found that polymer chains are particularly sensitive to mixing time and speed. In contrast to prior art mixing methods, illustrated in FIGS. 1 and 2, the mixing method of the present invention can result in uncoiled strands of polymer 10 whose charged sites 12 are exposed to attract the oppositely charged waste particles 14, as illustrated in FIGS. 4 and 5. This enables the greater attraction of waste particles per volume of polymer treatment additive. Addition of an anionic flocculant 18, as illustrated in FIG. 5, results in the attraction or latching onto a greater number of the cationic flocculants 10 and 12 which have attracted the very small waste particles 14. This is due to the fact that the mixing speed and time is sufficiently great to uncoil the polymer chain and expose the charge sites in order that the polymers 10 and 18 do not aggregate or form "globs", as well as the fact that the polymer chains 10 and 18 remain intact as the speed and time is not overextended. Some treatment additives are also susceptible to mixing time and speed variations, while others are not. For example, acids, clay, caustic and coagulants all perform optimally at high mixing speeds and times.

Referring back to FIG. 3, a low mixing energy requirement is one that requires a lower mixing time and a lower mixing speed than a higher mixing energy requirement. Thus, contaminated liquids and selected treatment additives which require a high speed for a prolonged period of time in order to optimally mix have a relatively high mixing energy requirement, whereas a contaminated liquid and selected treatment additives that only require a minimal amount of time and a low speed have a low mixing energy requirement. In order to simplify the process, the mixing energy requirements are classified into either low, medium, or high mixing energy requirements. With reference to FIG. 3, such could be illustrated by creating three diagonal areas across the table. The low mixing energy requirement being that of Speeds 1 and 2 at mixing times 20 and 30 seconds. Medium mixing energy requirements being at Speeds 2 and 3 for a range between 30 and 50 seconds. A high mixing energy requirement would be at Speeds 3 and 4 for the mixing times of 50 and 60 seconds. For the illustrated contaminated liquid and treatment additive mixture, a high mixing energy requirement would be necessary to completely and optimally mix the additives to the liquid. However, care would be taken not to over-mix the treatment additives to the liquid.

Figure 6:
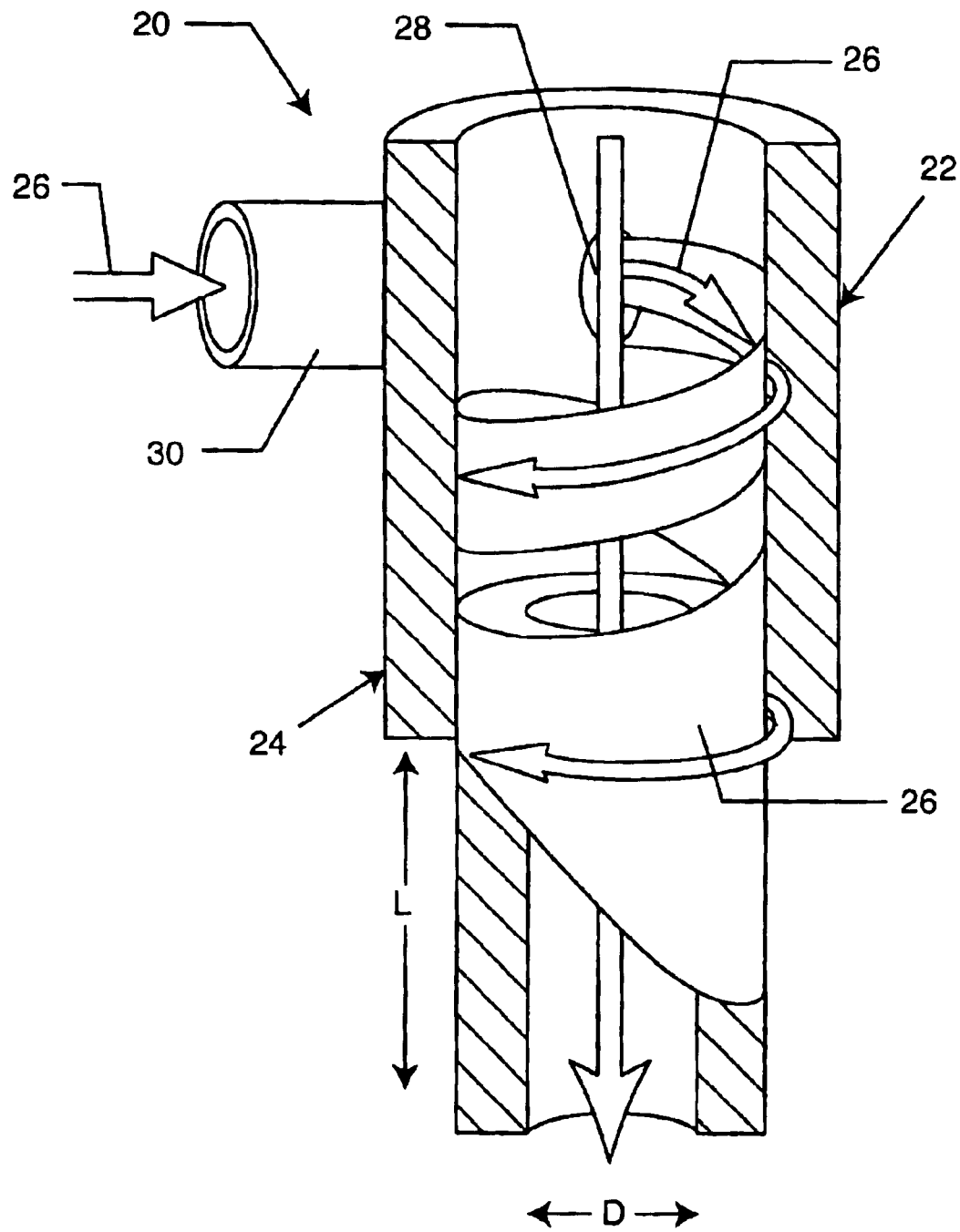
FIG. 6 is a cross-sectional view of a hydrocyclone having contaminated liquid and treatment additives passing therethrough in accordance with the present invention.
Figure 7:
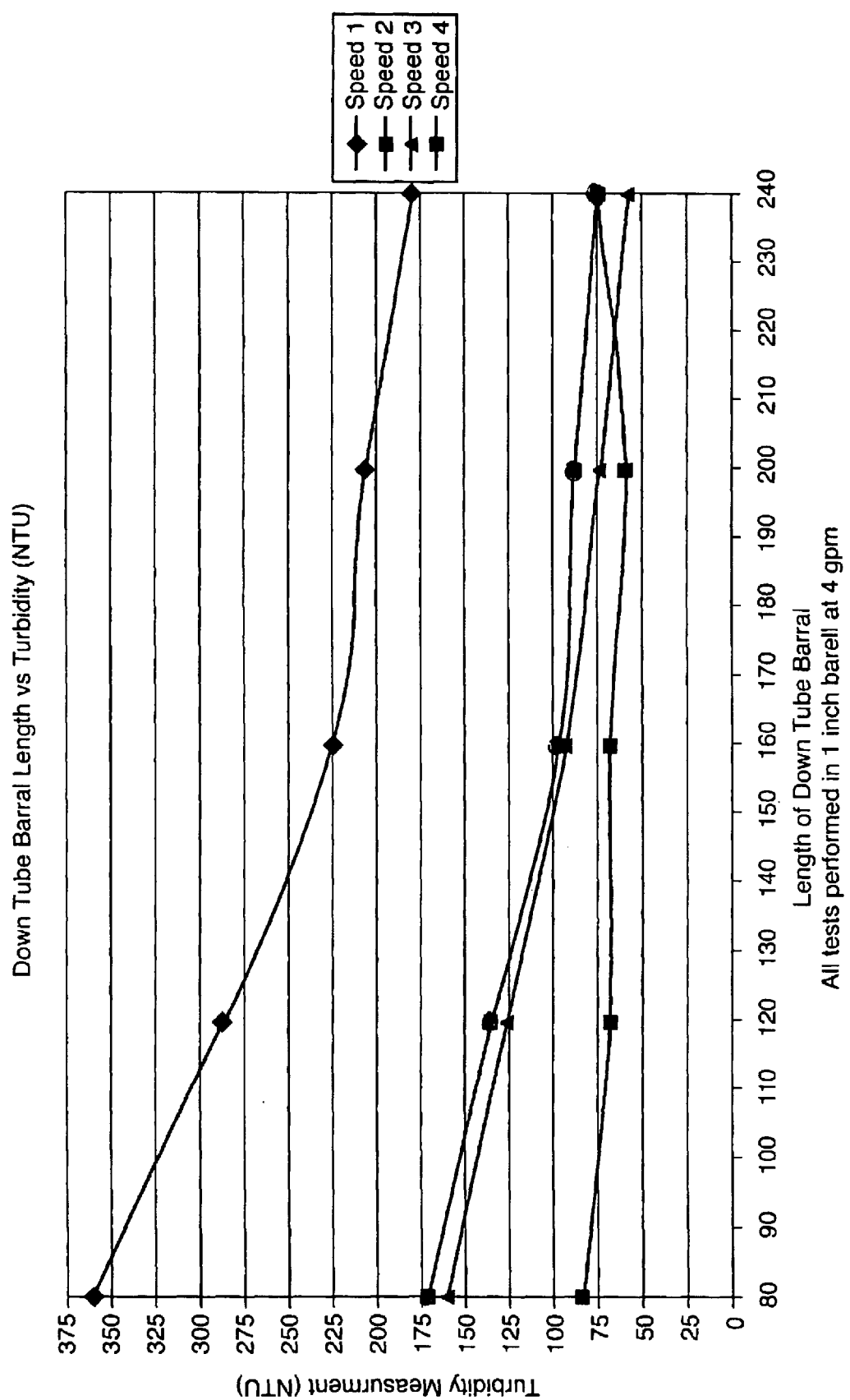
FIG. 7 is a graph illustrating the plotting of various hydrocyclone barrel lengths and fluid speeds.

With reference now to FIGS. 6 and 7, the contaminated liquid and the treatment additives must be passed through a system or apparatus to properly mix them. Once the optimal liquid energy requirement in the form of speed and time is assessed, the mixing system is designed to properly mix the selected treatment additives and the contaminated liquid.

With continuing reference to FIGS. 6 and 7, the mixing system includes at least one hydrocyclone 20. Such apparatuses are well-known in the prior art and used in separation procedures. However, such hydrocyclones have not been altered in certain physical parameters to match mixing energy requirements and effectively mix as this phenomenon has been discovered by the inventors. The hydrocyclone apparatus 20 used in accordance with the present invention is configured as a simple mixer having two basic parts, a reactor head 22 and a down tube or barrel 24. The contaminated liquid 26, which has treatment additives added upstream of the hydrocyclone apparatus 20, or injected therein for mixing, is introduced into the hydrocyclone 20. The liquid 26 is directed through an inlet 28 which is reduced in size compared to the conduit carrying the liquid 26 and configured to cause the liquid 26 to spin along the inner walls of the hydrocyclone 20 in a radial fashion, while extending downwardly in an axial direction down the length of the tube 24. The outside layer of spinning liquid is subjected to frictional forces as it comes into contact with the stationery down tube wall 24. The difference in velocity between the outside edge of the liquid and the freely rotating inside layer produces a vigorous mixing action. Eventually, the entire down tube 24 fills with the spinning liquid 26.

The aspect ratio or cross-sectional area of the hydrocyclone inlet aperture 28 determines the speed at which the liquid enters the down tube 24. As described above, this is a restrictive aperture. That is, at a given pressure, the pump will deliver a given quantity of liquid, normally described as gallons per minute. The size of the inlet aperture 28 and the hydrocyclone 20 is smaller than the pipe 30 that feeds the hydrocyclone 20. Since the flow of the liquid stream is constant, but the space through which the liquid 26 must pass is diminished, the speed at which the liquids travels through the aperture 28 increases. The aperture size determines the speed of the liquid into the down tube 24, smaller aperture holes 28 resulting in high speeds and larger aperture holes 28 resulting in lower speeds.

The acceleration of the liquid 26 into the down tube 24 is accomplished by the conversion of pressure energy into velocity energy. When this conversion occurs, there is an accompanying drop in liquid pressure after the liquid has traveled through the aperture 28. With reference to Table 1, the speed of the liquid can be determined by measuring the difference in pressure between the liquid 26 before it passes through the aperture 28 (referred to as P1) and after it passes through the aperture 28 (referred to as P2). Just as small aperture holes result in high liquid speeds, small aperture holes also result in high pressure differentials (Delta P). Large aperture holes result in low speeds, and low pressure differentials. By measuring the difference in pressures (Delta P), the speed of the liquid 26 can be determined as it enters into the down tube 24 of the mixing hydrocyclone apparatus 20. Table 1 illustrates the effect of that aperture hole size has on the conversion of pressure into speed and the ensuing drop in the pressure of the liquid as more energy is converted from pressure into speed.

TABLE 1

| Relative Size | Crossectional Area | GPM | P1 | P2 | DeltaP |
|---|---|---|---|---|---|
| 1x | 0.150 | 4 | 71 | 44 | 27 |
| 2x | 0.300 | 4 | 34 | 16 | 18 |
| 4x | 0.600 | 4 | 15 | 5 | 10 |

TABLE 1-continued

| Relative Size | Crossectional Area | GPM | P1 | P2 | DeltaP |
|---|---|---|---|---|---|
| 6x | 0.900 | 4 | 10 | 3 | 7 |
| 8x | 1.200 | 4 | 7 | 2 | 5 |

Another key component to the mixing apparatus and method of the present invention is the barrel 24 diameter. The barrel diameter determines the frequency at which the liquid 26 spins completely around the inside of the down tube barrel 24 (rotations per minute) and the volume of liquid traveling through the down tube per unit of time (gallons per minute—GPM). At a given speed, the distance that the liquid must travel in order to make a complete rotation inside the down tube 24 will increase as the diameter of the down tube 24 is increased. Smaller diameter down tubes yield higher rotations per minute due to the small distance required in order to make a complete rotation. Conversely, at the same initial speed, large diameter down tubes yield low rotations per minute due to the relative long distance that must be traversed in order to make a complete rotation. In addition to the reduction in the average rotation of velocity, the axial velocity is reduced by a factor proportional to the square of the radius. This increases the time that the liquid is exposed to mixing.

Another key component to the invention is that length of the down tube barrel 24. The time that the liquid 26 is subject to mixing is controlled by the length of the down tube 24. If it is determined that more time is required, the down tube 24 is lengthened. If less mixing time is required, then the down tube of barrel 24 is shortened. However, frictional forces will eventually convert the radial spinning component of the liquid flow 26 into simple laminar axial flow. If a liquid 26 requires prolonged mixing that is beyond the capacity of the particular hydrocyclone 20 to maintain, then the liquid 26 can be ported into a second, or even additional, hydrocyclones for the mixing process to be completed.

With reference now to FIG. 7, the chart illustrates the effects of using differing speeds (Speeds 1–4), a function of inlet aperture 28 cross-sectional area, as they relate to the length of the down tube barrel in inches, which provides increased mixing time, to arrive at a final turbidity measurement of the waste water liquid. The contaminated liquid and selected treatment additives for this particular figures were the same as FIG. 3. Thus, increasing the speed and lengthening the down tube barrel 24 generally resulted in a lower turbidity measurement. However, it will be noted that at the highest speed, Speed 4, over mixing actually occurred at a barrel length of 210 inches and greater. This is consistent with the magnetic mixing energy test of FIG. 3. Thus, a hydrocyclone having a relatively small aperture inlet 28, so as to attain Speed 4, and having a down tube barrel 24 of a length of 200 inches or less results in optimal mixing. Alternatively, the inlet aperture 28 is slightly increased in size so as to attain Speed 3 while the down tube barrel length is increased beyond 220 inches so that the mixing time is increased.

Figure 8:
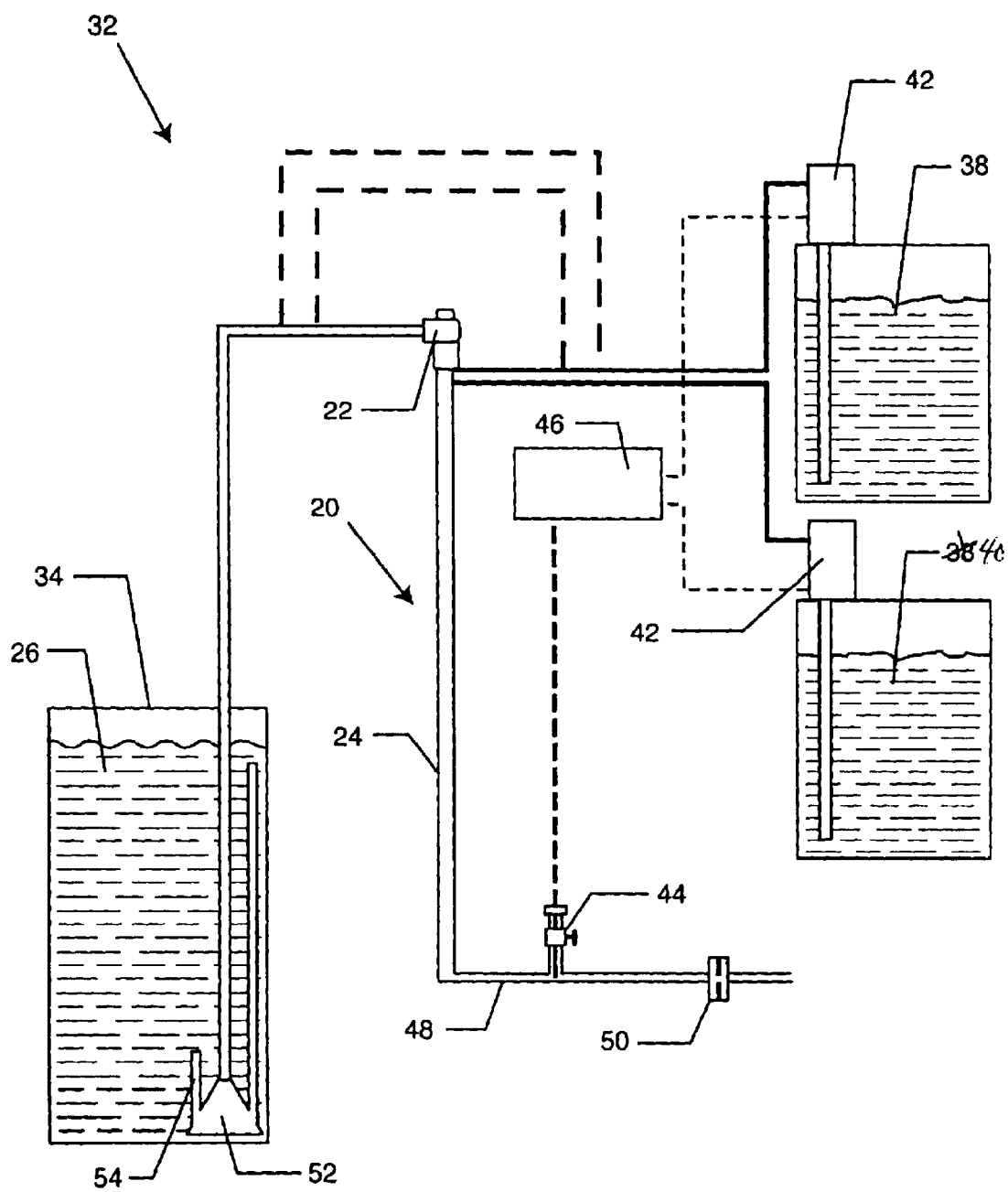
FIG. 8 is a schematic view of a mixing system embodying the present invention having a single hydrocyclone.

With reference now to FIG. 8, an exemplary mixing system 32 is illustrated wherein a tank 34 of the contaminated liquid 26 is fluidly coupled with a level sensor 54, and a pump 52 if necessary, to the hydrocyclone mixing apparatus 20. The aspect ratio, barrel diameter and barrel length of the hydrocyclone apparatus 20 are selected according to the predetermined mixing energy requirement procedure previously described in FIGS. 3 and 7. Although the hydrocyclone inlet aspect ratio or size and length of the barrel 24 can be adjusted to deliver very subtle changes in the speed, typically, the inlet aperture 28 is selected between one of three sizes to correspond with a lower mixing energy requirement, a medium mixing energy requirement for higher speeds, and a high mixing energy requirement at yet even higher speeds. The length of the down tube 24 is typically adjusted to substantially meet the mixing time necessary for the given contaminated liquid and selected treatment additives as previously described.

Sources of treatment additives 38 and 40 are coupled to the system so as to be added to the liquid 26 upstream of the hydrocyclone 20, or within the head 22 of the hydrocyclone 20 so that the liquid 26 and additives 38 and 40 can be mixed as they travel through the hydrocyclone 20. Chemical pumps 42 may be utilized in the case of liquid chemical additives. A sensor 44 may be installed downstream of the hydrocyclone 20 to verify that sufficient chemical and treatment additives 38 and 40 are being introduced into the stream of liquid 26. Electronic control mechanisms 46 can be used to increase or decrease the rate of pumping of the additives 38 and 40 to achieve the desired result.

The mixed liquid 26 and treatment additives 38 and 40 are then exited through outlet tube 48 to the next subsystem of the mixing and separation system. This may include the use of a cavitation plate 50 or the like to increase back pressure in the mixing system 32, and provide the necessary liquid pressure for flotation and flocculation steps.

Preferably, the liquid source 26 also includes a pump 52 and related sensors 54 and 56 to provide a constant source of contaminated liquid 26 to be treated. It should be understood that a single treatment additive 38 or 40 may be added to the contaminated liquid 26, or multiple treatment additives simultaneously.

Figure 9:
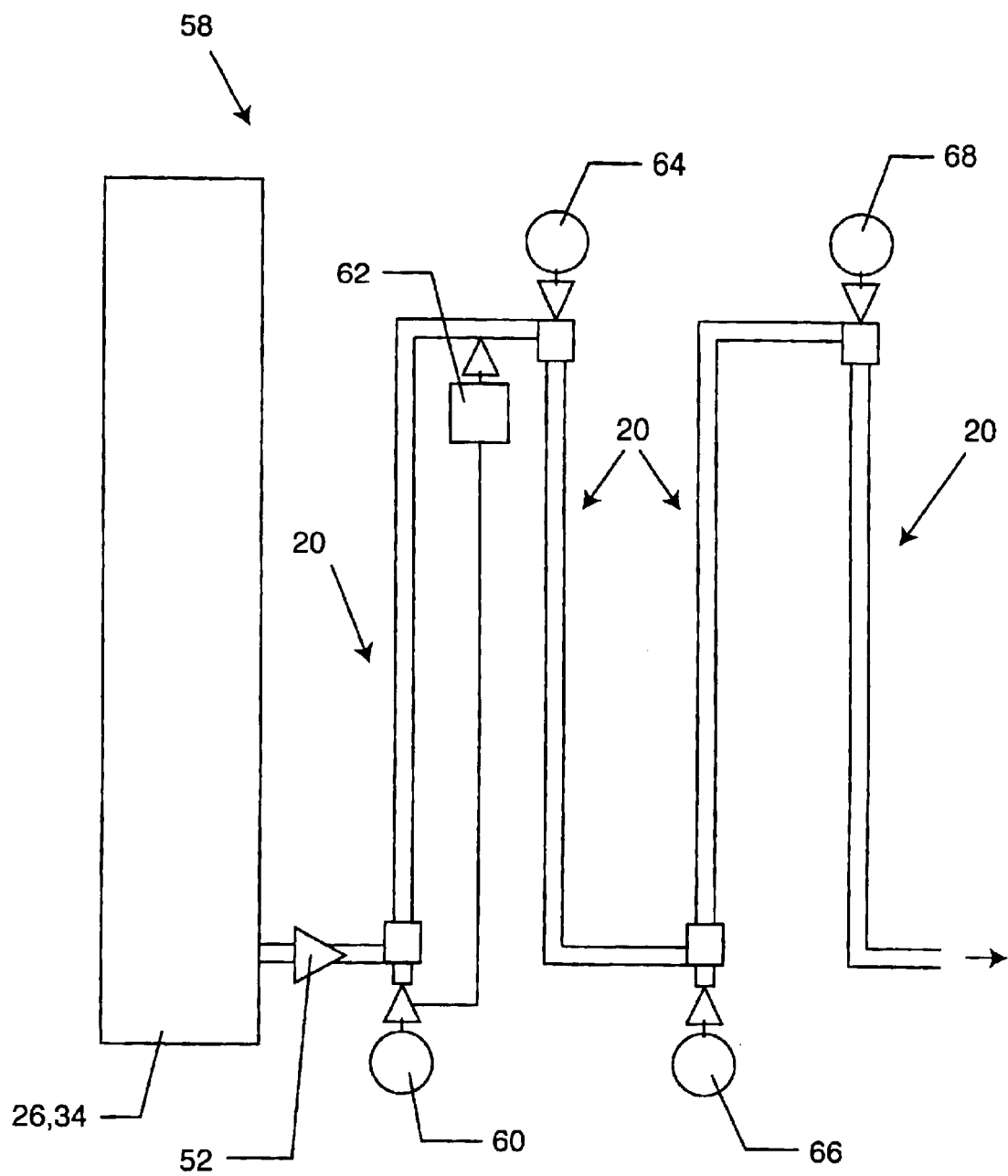
FIG. 9 is a schematic diagram of a mixing system in accordance with the present invention having multiple hydrocyclones fluidly coupled with one another.

With reference to FIG. 9, another system 58 is shown wherein the tank 34 of contaminated liquid 26 is fluidly coupled to a series of hydrocyclones 20. This may be the case when the mixing time is sufficiently large that a series of hydrocyclones 20 are necessary to provide the sufficient mixing time. Also, such an arrangement can be advantageously used to mix the selected treatment additives in stages so as to optimize the mixing of each treatment additive as well as taking into account the necessity of adding certain treatment additives in stages to treat the liquid. Thus, referring to FIG. 9, an acid treatment additive 60 is added into the first hydrocyclone 20. An acid sensor 62, which is coupled to the pump of the acid source 60 can be used to determine that sufficient acid has been injected into the system to bring the pH to the necessary and desired level. Powdered clay 64, for example, can then be added at the next hydrocyclone 20. Diatomaceous earth 66 can then be added at the next stage, and polymer 68 at the final stage. The treated liquid 26 is then directed to the next stage of the overall treatment system.

It will be readily apparent to those skilled in the art that the present invention, by optimally mixing the treatment additives and contaminated liquid results in a saving of treatment additives. Additionally, due to the fact that the treatment additives are fully mixed with the contaminants, a greater degree of contaminant removal can be achieved.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A process for mixing treatment additives to contaminated liquid, comprising the steps of: selecting one or more treatment additives; determining a mixing energy requirement of the contaminated liquid and the selected treatment additive(s); and directing the contaminated liquid and the selected treatment additive(s) into a mixing system including at least one hydrocyclone having an inlet cross-sectional area selected based upon the mixing energy requirement determination, and a barrel length and diameter selected based upon the mixing energy requirement determination.

2. The process of claim 1, wherein the selecting treatment additive(s) step includes the step of determining the identity of the additive(s) and the amount of each additive needed to treat the contaminated liquid.

3. The process of claim 2, wherein the selecting treatment additive(s) step further comprises the steps of mixing various treatment additives to a sample of the contaminated liquid over time and determining the effective additives and the amount of each additive necessary to treat a given volume of contaminated liquid.

4. The process of claim 1, wherein the mixing energy requirement determining step comprises the steps of mixing the treatment additive(s) over a range of time and mixing speeds, and measuring turbidity to determine the mixing time and speed which results in the lowest turbidity.

5. The process of claim 4, wherein a low mixing energy requirement requires a lower mixing time and mixing speed than a higher mixing energy requirement.

6. The process of claim 1, wherein the selecting of the inlet cross-sectional area of the hydrocyclone comprises the step of increasing the cross-sectional area of the inlet to correspond to a lower mixing energy requirement, and reducing the cross-sectional area of the inlet to correspond to a higher mixing energy requirement.

7. The process of claim 1, including the step of increasing the diameter or the length of the hydrocyclone barrel to increase the mixing time to correspond to a higher mixing energy requirement, and decreasing the length of the hydrocyclone barrel to decrease the mixing time to correspond to a lower mixing energy requirement.

8. The process of claim 1, including the step of fluidly coupling a plurality of hydrocyclones with one another.

9. The process of claim 8, including the step of adding the treatment additives in stages throughout the mixing system, the inlet cross-sectional area and barrel length and diameter of each hydrocyclone being selected based upon the mixing energy requirement determination of each treatment additive or group or treatment additives added to the contaminated liquid immediately upstream from that hydrocyclone.

10. The process of claim 1, including the step of classifying the mixing energy requirement into a low mixing energy requirement corresponding to lower mixing speeds and time, a medium mixing energy requirement based on higher mixing speeds and time, and a high mixing energy requirement based on yet higher mixing speeds and time.

11. A process for mixing treatment additives to contaminated liquid, comprising the steps of: determining the identity of one or more treatment additives and the amount of each treatment additive needed to treat the contaminated liquid; determining a mixing energy requirement of the contaminated liquid and the selected treatment additive(s) by mixing the treatment additive(s) over a range of mixing speeds and time, and measuring turbidity to determine the mixing time and speed which results in the lowest turbidity, wherein a low mixing energy requirement requires a lower mixing time and mixing speed than a higher mixing energy requirement; and directing the contaminated liquid and the selected treatment additive(s) into a mixing system including at least one hydrocyclone having an inlet cross-sectional area selected based upon the mixing energy requirement determination, and a barrel length and diameter selected based upon the mixing energy requirement determination.

12. The process of claim 11, wherein the selecting treatment additives step further comprises the steps of mixing various treatment additives to a sample of the contaminated liquid over time and determining the effective additives and the amount of each additive necessary to treat a given volume of contaminated liquid.

13. The process of claim 11, wherein the selecting of the inlet cross-sectional area of the hydrocyclone comprises the step of increasing the cross-sectional area of the inlet to correspond to a lower mixing energy requirement, and reducing the cross-sectional area of the inlet to correspond to a higher mixing energy requirement.

14. The process of claim 11, including the step of increasing the diameter or the length of the hydrocyclone barrel to increase the mixing time to correspond to a higher mixing energy requirement, and decreasing the length of the hydrocyclone barrel to decrease the mixing time to correspond to a lower mixing energy requirement.

15. The process of claim 11, including the step of fluidly coupling a plurality of hydrocyclones with one another.

16. The process of claim 15, including the step of adding the treatment additive(s) in stages throughout the mixing system, the inlet cross-sectional area and barrel length and diameter of each hydrocyclone being selected based upon the mixing energy requirement determination of each treatment additive or group or treatment additives added to the contaminated liquid immediately upstream from that hydrocyclone.

17. The process of claim 11, including the step of classifying the mixing energy requirement into a low mixing energy requirement corresponding to lower mixing speeds and time, a medium mixing energy requirement based on higher mixing speeds and time, and a high mixing energy requirement based on yet higher mixing speeds and time.

18. A process for mixing treatment additives to contaminated liquid, comprising the steps of: determining the identity of one or more treatment additives and the amount of each treatment additive needed to treat the contaminated liquid by mixing various treatment additives to a sample of the contaminated liquid over time and determining the effective additives and the amount of each additive necessary to treat a given volume of contaminated liquid; determining a mixing energy requirement of the contaminated liquid and the selected treatment additive(s) by mixing the treatment additive(s) over a range of mixing speeds and time, and measuring turbidity to determine the mixing speed and time which results in the lowest turbidity, wherein a low mixing energy requirement requires a lower mixing time and mixing speed than a higher mixing energy requirement; and directing the contaminated liquid and the selected treatment additive(s) into a mixing system including at least one hydrocyclone having an inlet cross-sectional area selected based upon the mixing energy requirement determination, and a barrel length and diameter selected based upon the mixing energy requirement determination; wherein the cross-sectional area of the inlet is increased to correspond to a lower mixing energy requirement, and decreased to correspond to a higher mixing energy requirement; and wherein the diameter or the length of the hydrocyclone barrel is increased to increase the mixing time to correspond to a higher mixing energy requirement, and the length of the barrel is decreased to decrease the mixing time to correspond to a lower mixing energy requirement.

19. The process of claim 18, including the step of fluidly coupling a plurality of hydrocyclones with one another.

20. The process of claim 19, including the step of adding the treatment additive(s) in stages throughout the mixing system, the inlet cross-sectional area and barrel length and diameter of each hydrocyclone being selected based upon the mixing energy requirement determination of each treatment additive or group or treatment additives added to the contaminated liquid immediately upstream from that hydrocyclone.

21. The process of claim 18, including the step of classifying the mixing energy requirement into a low mixing energy requirement corresponding to lower mixing speeds and time, a medium mixing energy requirement based on higher mixing speeds and time, and a high mixing energy requirement based on yet higher mixing speeds and time.

* * * * *